Oct. 14, 1969     S. WALLER     3,473,098
DIGITALLY PROGRAMMED POSITIONING MOTOR CONTROL SYSTEM FOR
MOVABLE MACHINE STRUCTURE
Filed Aug. 4, 1965
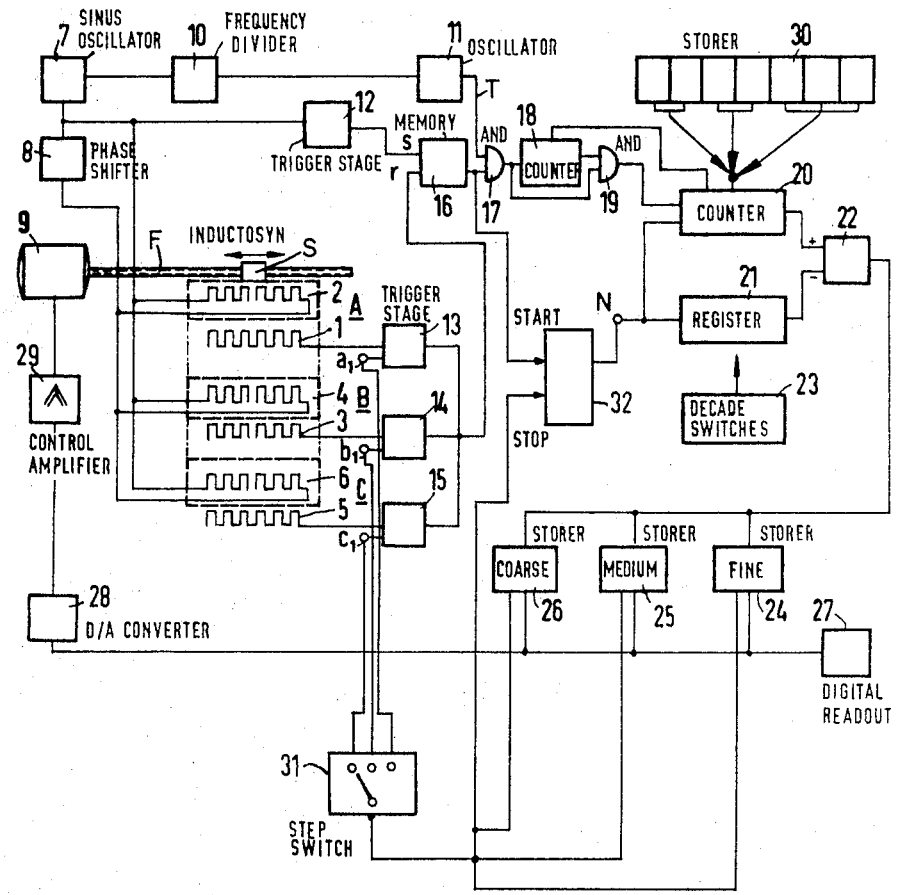

United States Patent Office 3,473,098
Patented Oct. 14, 1969

3,473,098
DIGITALLY PROGRAMMED POSITIONING MOTOR CONTROL SYSTEM FOR MOVABLE MACHINE STRUCTURE
Siegfried Waller, Erlangen, Germany, assignor to Siemens Aktiengesellschaft, Berlin, Germany, a corporation of Germany
Filed Aug. 4, 1965, Ser. No. 477,249
Claims priority, application Germany, Aug. 6, 1964, S 92,495
Int. Cl. H02p 1/54, 5/46, 7/68
U.S. Cl. 318—18   5 Claims

ABSTRACT OF THE DISCLOSURE

A positioning control system for a movable machine structure comprises a resolver having coarse periodic graduation portions and output voltages whose phase positions vary in accordance with positional changes of the movable structure. A time encoder has a clock pulse source and a counter connected to the source and to the resolver for counting the clock pulses from a phase reference point to the zero passage of one of the output voltages. The resolver portion is sequentially controlled to cause the output voltage to effect counting of the pusles. The counter is cleared prior to each counting operation. A monitor connected to the counter pre-sets the cleared counter to steps for the sequential counting operations. The results of the counting operations are stored in memories and the structure is moved by a drive control in accordance with the stored results.

---

My invention relates to a control system for positioning movable structure of fabricating machinery, particularly machine tools, and is related to, and an improvement upon, positional control systems according to my copending application Ser. No. 371,069, filed May 28, 1964, assigned to the assignee of the present invention.

In a more particular aspect my invention relates to control systems in which a positional change of machine structure is sensed and digitized by means of a scaling or resolver device operating as a phase shifter and constituting a periodically graduated analog measuring system in which each position of the movable structure corresponds to a given phase displacement between an alternating input voltage and the resolver output voltage. The phase displacement is determined and converted from its analog to a digital value by counting a pulse of a given clock frequency, commencing with each zero passage of the input voltage and terminating at each subsequent zero passage of the phase displaced output voltage (so-called intermittent phase measuring operation). The position of a movable machine structure for example the tool support of a machine tool, can thus be determined. However for the purposes of the invention a direct digital sensing or measuring of the position is also applicable This is because for measuring positional localities, both both digital and analog systems must derive their intelligence from some scale of units whose length is predetermined by the available travel distance of the movable machine structure.

The simplest measuring method known resides in counting from a fixed starting position continuously in the forward or reverse direction (incremental method). The starting position, corresponding to the zero value of the count, can be placed at any desired point of the travel path by clearing the counting memory at this point. Linear measuring scales with mutually spaced points or dashes, or rotating pulse transmitters with optical scanning means, furnish a sequence of pulses corresponding to units of measurement. The measuring method is not absolute because each subsequent measuring result is based upon the preceding results. That is, any counting error, once occurred, will affect all further measuring results. If the workpiece is being machined during the positioning operation, the occurrence of oscillations in the machine structure at amplitudes smaller than the chosen measuring unit may cause the pulse generator to issue faulty pulses which may cumulatively enter into the result.

Digital absolute measuring scales or encoder discs afford preventing the above-mentioned disadvantages of the incremental method. The measurements of the programmed positions are represented by a matrix in a black-white or yes-no code, each numerical measuring value being definitely correlated to a singular travel point. The danger of inaccurate reading at the edges of the matrix fields is obviated by a special design of the read-out means (such as the use of a V-brush arrangement) or by applying a special code (Gray code). All measurements taken are related to a fixed zero point which constitutes the beginning of the measuring scale. However more equipment is needed than with a simple counting method.

Also known is an analog method of measuring the local position value with the aid of synchro-rotational field systems. A synchro is a single-phase transformer constituted by a relatively small electrical machine composed of a stator and a rotor. The stator has three windings 120° spacially displaced from each other, with the aid of which the magnetic axis can be rotated through any angle in space by means of an externally applied voltage. The error voltage induced in the rotor winding becomes zero upon each rotation of 180° electrical, so that any given travel distance is represented by the analog of a singular angle. By combining several synchros through a measuring transmission gearing of suitable transmission ratio, any large distance can thus be given a univalent angular representation with any desired large resolving power. However, the amount of equipment needed often exceeds satisfactory limits.

This advantage of a rotating synchro system is avoided by an inductively operating resolver device of high accuracy in which three windings of respective coarse, medium, and fine scaling systems are disposed on a linear scale, preferably in form of a printed circuit, the three windings having all the same performance with the exception of the difference in graduation. The carrier plate for the printed circuitry may consist of a structure that forms part of the machine to be controlled and is suitably insulated for this purpose so as to eliminate faults as may be caused by non-uniform thermal expansion between measuring scale and machine structure.

It is known to impress such inductive resolver systems of absolute performance with a pattern voltage indicative of the datum value of the locality to which the machine structure is to be positioned, this datum value being supplied from punched tape through decadically graduated transformers. The output circuit of each of the three resolver systems then furnishes a voltage which is indicative of the departure between the prescribed datum or pattern value and the actual instantaneous position of the controlled machine structure. While the machine structure travels toward the datum position, the coarsest measuring system first issues the control command. When the moving machine structure approaches the programmed datum value of the locality, the control is switched over to the medium resolver system and subsequently to the fine system. It is not possible to determine the acutal departure of the instantaneous position of the machine structure from the desired datum position, unless a large amount of auxiliary equipment is added. Consequently the necessary point at which the switching from one to the other system occurs in order to correspondingly reduce the travel speed of the moving structure as it approaches the datum position, involves some amount of stray which delays the ultimate positioning.

It is also known to convert instantaneous analog values of a scaling system into a digital value by continually repeated (intermittent) phase measurement. This type of performance is embodied in the systems described in my above-mentioned copending application Ser. No. 371,069. It requires that a number of pulses proportional to the phase displacement be counted into a counter of a logic system in which the counted numerical values are compared with a numerical datum value.

Relating to such intermittent phase measurement, it is an object of my invention to provide a positional control system superior to the above-mentioned analog measuring systems of different type and also superior to the control systems according to my copending application in affording a highly accurate and reliable positioning control with much simpler means than heretofore proposed.

According to the present invention, a positioning control system for movable machine structure is equipped with the above-mentioned resolver means of the phase-shift type having a plurality of resolver portions of more and less coarse periodic graduation respectively and having an alternating input voltage and respective output voltages whose phase positions vary in accordance with positional changes of the movable machine structure, the system being further provided with time encoder means having a clock-pulse source and having a main counter connected to the pulse source and to the resolver for counting the clock pulses from each zero passage of the input voltage to the next zero passage of one of the respective output voltages. I further provide the system with means for sequentially controlling the differently graduated resolver portions to cause the respective output voltages to effect counting of the above-mentioned pulses after the main counter has been cleared prior to each counting operation; and I connect the counter with monitor means which preset the cleared counter to respective counting steps for the individual sequential counting operations. The system is further provided with respective memories which receive the counted results and control the machine drive for moving the machine structure in dependence upon the results stored in the memories.

By virtue of the fact that, prior to each individual measuring operation, the count indicative of the datum position is preset into the cleared counter for each of the resolver portions that sequentially effect counting of pulses into the counter, and since each counted result is transferred to a memory, it becomes possible to provide for numerical control in which the intermittent phase measurement is alternately performed with the respective individual resolver portions, and in which, by presetting of the counter, the memories directly offer the amount of departure of each count from the predetermined, programmed datum position value. The invention also affords eliminating the need for separate components for forming the digital difference between the datum value and the actual value of the position being controlled. Furthermore, in distinction from purely digital measuring systems, the real position can immediately be ascertained as soon as, after the occurrence of voltage failure, the voltage is reestablished.

Preferably the counter is released for counting pulses from the coarser resolver portion, only after a pilot counter, preset with the highest digit value of the measuring result from the finer resolver portion, has been set back to the zero position by reversely counting the pulses coming from the coarser portion. This permits avoiding such errors as may occur in the coarser resolver portion due to the digitizing of the measured values.

According to another feature of my invention, it is further preferable to employ as main counter a shift register and to connect it with a preset zero-point shift register to respective inputs of a difference-forming stage for decadic comparison. In this manner, each position of the machine structure may be selected as the zero point of the travel to be controlled, in spite of the analog character of the measuring system. The zero-point shift register is then preferably pre-adjusted by automatic program or monitor control from a punch tape or with the aid of manual decade switches, in order to set the desired zero-point displacement and/or to take into account any necessary compensation for the change in diameter of a milling cutter or other wear of the tool proper. This permits entering simple corrections into the machine control system to secure accurately predetermined measurement in the workpiece being machined.

Further features of the invention will be apparent from the following description in conjunction with the embodiment of a control system illustrated by way of example in the accompanying drawing.

The drawing shows schematically a positioning control system for a machine tool. The individual blocks or logic modules shown in the drawing are known and commercially available as such. Relative to their internal circuitry and interconnections reference may be had to my above-mentioned copending application Ser. No. 371,069, as well as to the literature mentioned therein. However, references to further literature and to commercially available logic modules suitable for the purposes of the invention will be given hereinafter.

The accompanying drawing shows schematically a feed spindle F which is driven from a reversible electric motor 9 and carries a horizontally displaceable slider S, such as the support for a tool. The control system for the machine tool comprises a travel measuring device composed of three analog resolver portions A, B, C of the inductive type, which are periodically graduated, for example in a ratio of 1:100 relative to each other, so that resolver portion A measures the travel distance in fine units of length, portion B the same travel distance in medium units, and portion C the same distance in coarse units. The measuring values thus obtained from each system are to be digitized.

Each of the three resolver portions is formed of two inductance windings of which one 1, 3, 5 constitutes a linear measuring scale and is fixedly coordinated to the machine tool, whereas the other winding 2, 4, 6 is connected with the movable structure S of the machine as is indicated by a dot-and-dash line. Consequently, the assembly of movable inductance windings 2, 4 and 6 is displaceable as a rider relative to the assembly of scaling windings 1, 3 and 5. Each rider winding 2, 4, 6 consists of two coils electrically displaced 90° from each other, which are energized from a sine-voltage generator 7, for example at a frequency of 2 kilocycles per second, by two respective alternating voltages 90° phase displaced from each other. The phase displacement of 90° is secured by means of a phase shifter 8. This excitation of the rider windings produces in each of the resolver portions A, B, C a travelling field which induces a sinusoidal voltage in each of the respective scaling windings 1, 3, 5. The phase position of the induced voltages depends upon the instantaneous position of the rider windings 2, 4, 6 relative to the respective fixed scaling windings.

Such a measuring system, constituting a resolver of the phase-shift type, is commercially known under the trade name Inductosyn and is known from U.S. Patent 2,875,390. The illustrated triple-track embodiment of the phase-shift resolver has a periodic graduation of 1:100, namely a fine track A of 1 mm. graduation, a medium track B of 100 mm. graduation, and a coarse track C of 10,000 mm. graduation.

The sine-wave generator 7 is synchronized from a quartz oscillator 11 by means of a frequency divider 10. The quartz oscillator 11 forms the master clock of the control system and furnishes clock pulses of much higher frequency than the sine-wave generator 7; for example, the clock pulse frequency is 2 megacycles per second. Suitable frequency dividers 10 are known for example from the book "Pulse and Digital Circuits" by Millman and Taub, 1956, New York, chapter 12. The frequency divider may also be formed of a counter which issues an output signal only after a given number of clock pulses received from the oscillator 11, the output signal then synchronizing the sine-wave generator 7. Such synchronizing devices for a sine-wave generator by counting pulses are also known from the just-mentioned book, pp. 386–390.

The sine-wave generator 7 is further connected with a monostable flip-flop stage 12. The scaling coils 1, 3, 5 of the individual resolver portions A, B, C are connected with further monostable flip-flop stages 13, 14 and 15 respectively. The flip-flops 12 to 15 have the property of abruptly changing their output voltage as soon as the input voltage reaches a given threshold value. By applying signals to individual control inputs $a$-, $b1$, $c1$, the respective flip-flops 13, 14 and 15 can be blocked or released, and thereby be operated in the desired sequence by sequentially removing the blocking signal with the aid of suitable switching means.

Monostable flip-flops or multivibrators suitable for items 12 to 15 are well known as such and available from various manufacturers. For example, they may each consist of a time-delay flip module type N495K obtainable from Siemens-Schuckertwerke A.G., the assignee of the present invention, and described and illustrated (FIG. 10) in a paper entitled "Construction of the Simatic-System" by W. Weitbrecht and G. Sinn, published in Siemens-Zeitschrift of October 1959, pp. 598–606. In the following description, parenthetical references will be given to suitable logic modules commercially available from the same source and illustrated in the same paper. (The above-mentioned quartz oscillator 11 is available as type N495G; the frequency divider 10 may be composed of modules N495B.)

The output of flip-flop 12 is connected with the set input $s$ of a memory 16, and the outputs of the flip-flops 13, 14 and 15 are jointly connected with the reset input $r$ of the same memory 16. The memory 16 may consist of a bistable flip-flop stage (N495M; FIG. 9 of the paper). The memory 16 and a clock-pulse line T from the oscillator 11 are connected to the respective inputs of an AND-gate 17 which has its output connected directly and also through a pilot counter 18 to the two inputs respectively of another AND-gate 19. The output of gate 19 is connected to the input of a main counter 20 which is a shift register and also receives clock pulses on the synchronizing line T. The AND-gates 17 and 19 may be of any conventional type (for example module N495–X3; FIG. 7 of the paper). The pilot counter and the main counter 20 are preferably formed of respective shift registers (each composed of modules N495B|M, bistable flip-flop according to FIG. 9 of the paper).

The datum values for the individual portions A, B, C of the resolver are preset into the main counter 20 from a datum value transmitter 30 which thus constitutes the programmer or monitor of the control system. The pulses entering into the main counter 20 from gate 19 return the counter from the preset counting step back to the zero count. As mentioned, a decade value can be transferred from the main counter 20 into the pilot counter 18. The main counter 20 is connected to one input of a difference-forming stage 22 whose other input is connected to the output of a zero-point shift register 21. The output of the difference-forming stage 22 is connected to the inputs of a fine storer 24, a medium storer 25, and a coarse storer 26. The storers 24, 25 and 26 may consist of shift registers composed of bistable flip-flops (type 495R). The values stored in the storers 24 to 26 are supplied to an indicator tube 27 and also to a digital-to-analog converter 28 from which the output passes through a proportional-integral regulator 29 of amplifying performance from which the above-mentioned drive motor 9 for the movable machine structure is regulated.

The operation of the system is as follows:

For measuring with the finely graduated portion A of the resolver, the trigger flip-flop 13 is released by applying a signal to the line $a1$, the flip-flops 14 and 15 and consequently the resolver portions B and C remaining blocked. When the sine voltage furnished from generator 7 passes through zero, the flip-flop stage 12 is triggered. Its output signal appears on the set input $s$ of memory 16 and sets this memory so that a signal appears on the output of the memory. This completes the coincidence condition for the AND-gate 17 so that clock pulses from the oscillator 11, having a frequency of 2 m.c.p.s., are counted into the main counter 20, assuming that they will pass through the pilot counter 18. The purpose of the pilot counter 18 and of the AND-gate 19, here neglected, will be explained in a later place. When the voltage induced in the scaling coil 1 passes through zero, the flip-flop 13 is triggered. Its output signal appears on the reset input $r$ of the memory 16 and clears the memory thus blocking the AND-gate 17 to the clock pulses coming from the oscillator 11.

The counted result then set into the main counter 20 would be a measure of the distance by which the position of the movable machine with the rider S departs from the zero position within the cycle period. To obtain a comparison between the datum value and the actual value of the position, the three lowest decade values are pre-entered into the main counter 20 from the datum-value monitor 30 prior to beginning the measuring operation. As a result, the reference point within the cycle period is displaced in accordance with the pre-entered numerical amount relative to the absolute zero point of the cycle. After termination of the reverse counting operation effected by the clock pulses from gate 17, the main counter 20 therefore is set to a counted value which corresponds to the difference between the datum value and the actual value of the fine measure. This value of departure is entered into the fine-value storer 24. So far, the difference-forming stage 22 and the zero-point shift register 21 have not yet been taken into consideration.

The above-described operation is thereafter repeated in the same manner for the medium-graduation portion B of the resolver and thereafter for the coarsely graduated resolver portion C. In each case the main counter 20 is preset from the monitor 30 in accordance with the datum-value decades corresponding to the particular track or resolver portion. The values to which the main counter 20 is thus ultimately set during the individual measuring operations are transferred to the respective storers 25 and 26.

Consequently, after three sequential measuring operations have been completed, the storers 24, 25 and 26 contain the departure of the actual machine position from the predetermined datum value. This is based on the assumption that the reference point from which on the datum value is measured, coincides with the absolute zero point of the measuring systems.

Relative to the illustrated embodiment it is assumed, in accordance with actual practice, that the digitalization of the values furnished from the measuring systems can be accurately performed within the error limits of ±0.5%. Since the quantizing step is 1%, this would lead to difficulties when measuring with the medium-graduation and coarse-graduation portions of the resolver if a value from 5 to 9 is present in the fine-graduation portion relative to the medium system, or if such a value is present in the medium system relative to the coarse system. These difficulties are comparable to those encountered with a digital absolute measuring system where they can be coped with by employing a V-brush arrangement or by using a special code. In the illustrated system according to the invention such difficulties, however, are also avoided. This is achieved as follows.

A pilot counter 18, forming a decade, is interposed between the AND-gate 17 and the main counter 20. When performing a measuring operation with the medium-graduation portion of the resolver, the pilot counter is supplied with the third decade of the measuring result from the fine-graduation resolver portion. When the counting operation in the medium resolver portion commences, that is when the AND-gate 17 is opened, the clock pulses passing through the gate 17 first enter into the pilot counter 18. At first, the main counter 20 remains blocked to the pulses because the coincidence condition of the AND-gate 19 is met only after the pilot counter 18 has counted back to zero. Consequently the first pulses arriving from the medium-graduation resolver portion cause the pilot counter 18 to count back to zero. Only thereafter can the counting of the pulses into the main counter 20 commence. This corresponds to a displacement of the reference zero point by 0 to 9 units (‰ or tenths of a percent) for the subsequent main counter. In this manner an accurate and reliable measuring with the medium and coarse resolver tracks is afforded.

Generally, a zero-point displacement is necessary since, as a rule, the absolute zero point of the measuring system cannot be simultaneously used as reference point for machining a workpiece. For determining the required zero-point displacement, the movable structure of the machine is to be shifted to the desired position. When this position is reached, the datum-value monitor 30 is set to 0, and the measuring operation is thereafter performed with reference to this shifted zero point. The result stored in the storers 24 to 26 corresponds to the displacement of the reference point relative to the absolute zero point. This value, apparent from the storers 24 to 26, is then entered into the zero-point shift register 21 by means of decade switches schematically indicated at 23.

The decade switches 23 are constituted, for example, by a set of manually adjustable selector switches of the dial type which permit setting the respective digits of a decimal number to any desired digit value from 0 ... 9. Such multiswitch preselectors for digital posting of numerical values are commercially available. The purpose of the decade switch unit 23 will be more fully understood from the following.

The monitor 30 is essentially a programming memory which furnishes a datum value, read off a punch tape or other datum carrier, for the desired position of the displaceable machine structure such as a movable tool support. As described, this datum positional value is entered into the main counter 20. After the measuring operation, the setting of the main counter 20 corresponds to the difference between the datum value and the actual value of the position relative to the absolute zero point of the measuring system, also as explained above. Normally, however, the position of the zero point of the workpiece, for example a first bore hole or the edge of the workpiece, does not coincide with this absolute zero point. For that reason, the reference point of the workpiece is "electrically" placed upon the zero point of the measuring system. This purpose is served by the manually adjustable decade switches 23 in which the necessary zero-point displacement is to be stored by setting the dial switches to the corresponding digit values. The decades switches set the zero-point shift register 21 accordingly. As a result, the value occurring on the output of the difference-forming module 22 constitutes the corrected difference between datum value and actual value, and thus denotes the distance which the tool support must actually travel in order to place the workpiece at the correct position.

For some kind of work, it is desired that the zero point of the machine travel be different from the reference point of the measuring system by a known amount. In this case the amount of the desired difference may be entered into the datum-value monitor 30. By then performing the above-described operation, the position of the reference point can be determined by the measuring operation. The zero-point setting of the reference point, stored in the decade switches 23, is then transferred from decade to decade in parallel relation into the respective decades or digit positions of the zero-point shift register 21.

When the measuring operation for the fine track A is terminated, the transfer of the counting result to the fine storer 24 is not effected directly but through the difference-forming stage 22. The difference formation takes place in a series operation in which simultaneously the ultimate decade of the counter 20, composed as a shift register, and the last decade of the zero-point shift register 21 are applied to the respective inputs of the difference-forming stage 22. The result of the difference formation is transferred into the last decade of the fine storer 24. Thereafter a shift pulse appears at N simultaneously for the main counter 20 and the zero-point shift register 21 so that now the penultimate decade is connected with the difference-forming stage 22. The result is then entered into the penultimate decade of the fine storer 24. This performance is repeated for each decade, so that upon completion of the measuring operation for all three tracks the zero-point shift register 21 is empty, i.e. shifted to zero.

Each time the entering of the difference values into one of the respective storers 24 to 26 is terminated, a pulse is issued to a stepping switch or step counter 31 thus switching it one step forward so as to trigger the next one of the following monostable flip-flops 13 to 15.

Whenever the counting of a sequence of pulses into the counter 20 is completed, the output signal of the memory 16 vanishes. This causes a pulse generator 32 to start running and to issue the above-mentioned shift pulses to the input N of the zero-point shift register 21. When the shifting operation is terminated, this being indicated by the cessation of entries into the storer 24, 25 and 26, the pulse generator 32 is stopped.

For each new measuring operation, the transfer of the value stored in the decade switches 23 is repeated. The measuring and computing operation thus performed in the logic system may be completed within extremely short time. For example with a generator frequency of 2 k.c.p.s. and three resolver portions as described, a measuring sequence of 3 to 4 milliseconds is applicable.

A control system according to the invention is also applicable for measuring the instantaneous actual value of the machine position, the measuring being performed relative to the absolute zero point of the measuring system or relative to any selected reference zero point determined by the setting of the decade switches 23. For thus measuring the actual positional value, the main counter 20 is not preset by the datum-value monitor 30, so that the actual position minus the zero adjustment is available in the storers 24 to 26 and is thus indicated by the indicator 27.

A system according to the invention furthermore can be employed simultaneously for positional control along a plurality of coordinate axes. When in this case the machine travel is performed along only one of the coordinate axes, the particular datum value for the proper coordinate is entered into the datum-value monitor 30, and the zero-point displacement for this coordinate is transferred into the zero-point displacement register 21. Consequently, a decade-switch group 23 is required for each of the coordinate axes.

A system of the latter type further affords the possibility of performing a correction of the measured values by adding additional decade switch groups. The corrective or compensating value for the tool employed is stored in the individual decade switch groups, this compensating value constituting the particular zero-point displacements required for the respective tools.

With the aid of a system according to the invention, furthermore, a compensation of changes in the radius of a milling tool, or other wear of a tool, can be secured in the same manner. For this purpose the difference-forming stage 22 must be selectively capable of also performing an adding operation.

A numerical control with analog-absolute measuring systems according to the invention may be composed of solid-state modules without any mechanically operating switch contacts. The resolver and control systems according to the invention may also be used for railway or elevator control.

In lieu of the three-track inductive resolver in the above-described embodiment, a system according to the invention may also be equipped with rotational synchro transmitters in conjunction with a correspondingly graduated transmission gearing.

To those skilled in the art it will be obvious from a study of this disclosure that various other modifications with respect to individual logic components and their interconnection are applicable and hence that the invention may be given embodiments other than particularly illustrated and described herein, without departing from the essential features of my invention and within the scope of the claims annexed hereto.

I claim:

1. A positioning control system for movable machine structure, comprising resolver means having a plurality of portions of more and less coarse periodic graduation respectively and having respective output voltages whose phase positions vary in accordance with positional changes of said movable structure; time encoder means having a clock-pulse source and having a counter connected to said source and to said resolver for counting the clock pulses from a phase reference point to the zero passage of one of said respective output voltages; means for sequentially controlling said resolver portion to cause said respective output voltage to effect counting of said pulses; means for clearing said counter prior to each counting operation; monitor means connected to said counter for pre-setting the cleared counter to respective steps for said sequential counting operations; memories for storing the results of the respective counting operations; and drive control means for moving said structure independence upon the results stored in said memories.

2. A positioning control system for movable machine structure, comprising resolver means of the phase-shift type having a plurality of portions of more and less coarse periodic graduation respectively and having an alternating input voltage and respective output voltages whose phase positions vary in accordance with positional changes of said movable structure; time encoder means having a clock-pulse source and having a counter connected to said source and to said resolver for counting the clock pulses from each zero passage of the input voltage to the next zero passage of one of said respective output voltages; means for sequentially controlling said resolver portion to cause said respective output voltage to effect counting of said pulses; means for clearing said counter prior to each counting operation; monitor means connected to said counter for pre-setting the cleared counter to respective steps for said sequential counting operations; memories for storing the results of the respective counting operations; and drive control means for moving said structure in dependence upon the results stored in said memories.

3. A positioning control system according to claim 2, comprising a pilot counter interposed between said counter and said resolver, circuit means connected to said pilot counter for pre-setting it in accordance with the highest digit of the measuring result furnished from the less coarsely graduated resolver portion, said pilot counter having a zero-count output connected to said counter to release the latter for counting of pulses from a more coarsely graduated resolver portion only after said pulses have placed said pilot counter to zero.

4. In a positioning control system according to claim 2, said counter being a shift register, a zero-point shift register for pre-setting of counts, a difference-forming stage interposed between said counter and said memories and having respective inputs connected to said counter and to said zero-point shift register, said difference-forming stage having an output connected to said memories.

5. A positioning control system according to claim 4, comprising control means for decadic pre-setting of said zero-point shift register.

References Cited

UNITED STATES PATENTS 3,327,101   6/1967   Evans.

ORIS L. RADER, Primary Examiner

THOMAS E. LYNCH, Assistant Examiner

U.S. Cl. X.R.

90—13; 235—151.11; 318—30, 162